No. 870,656. PATENTED NOV. 12, 1907.
C. B. WOODWORTH.
DETACHABLE TREAD FOR PNEUMATIC TIRES.
APPLICATION FILED DEC. 12, 1906.
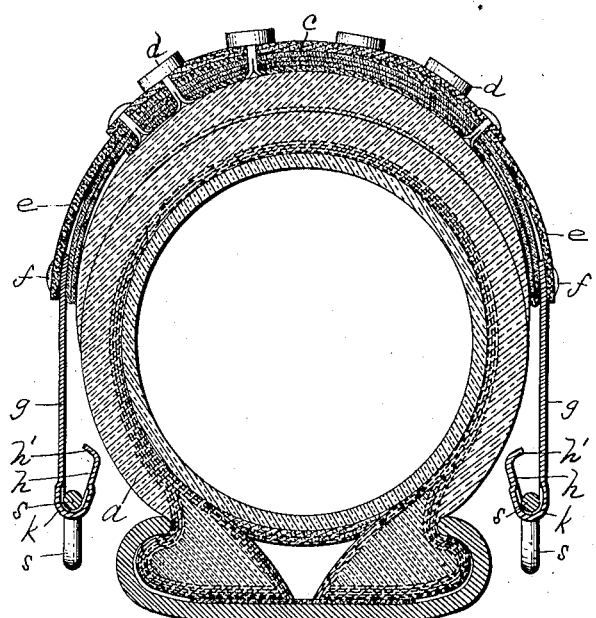
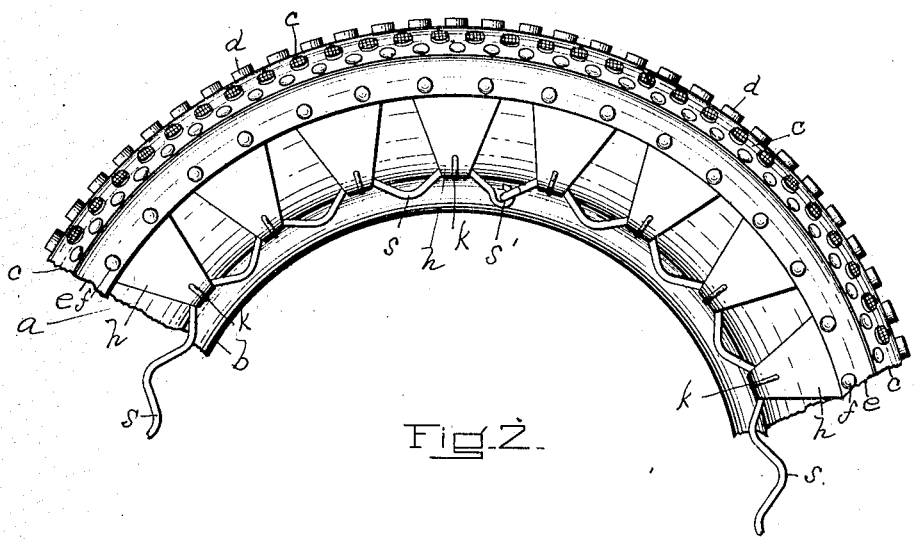

UNITED STATES PATENT OFFICE.

CHARLES B. WOODWORTH, OF NEWTON, MASSACHUSETTS.

DETACHABLE TREAD FOR PNEUMATIC TIRES.

No. 870,656.  Specification of Letters Patent.  Patented Nov. 12, 1907.

Application filed December 12, 1906. Serial No. 347,438.

To all whom it may concern:

Be it known that I, CHARLES B. WOODWORTH, a subject of the King of Great Britain, residing in Newton, in the county of Middlesex and State of Massachusetts, have invented certain new and useful Improvements in Detachable Treads for Pneumatic Tires, of which the following is a specification.

This invention relates to detachable treads adapted to be applied to and removed from a pneumatic tire, more particularly when the tire is in place on the wheel, such device being sometimes termed a "tire-protector" or "cover".

The invention relates particularly to that portion of the tire-protector by means of which the tread portion is held in position on the tire.

In the present invention, each edge of the tread-portion is connected by means of suitable radially arranged hooks with a wire which is adapted to extend entirely around the wheel, and is of such a shape that it can stretch and contract in the direction of its length—stretching or expanding when the tire is being inflated, retaining always an even tension on the cover, and springing in the direction of its length when it is in use. Moreover the shape of the wire is such as to effectually prevent the cover from "creeping".

The nature of the invention is fully described below, and illustrated in the accompanying drawing, in which:—

Figure 1 is a cross section showing a portion of my improved detachable tread in position on a pneumatic tire. Fig. 2 is a side elevation showing a portion of a pneumatic tire with a corresponding portion of the tread in position thereon.

Similar letters of reference indicate corresponding parts.

$a$ represents an ordinary pneumatic tire, and $b$ is the rim of the wheel.

The main portion of the tread comprises preferably a plurality of layers $c$ of suitable material or materials secured together by rivets $d$, or in any other manner—the arrangement of the layers and rivets not being new in the present invention. From these layers there extends down on each side a flap $e$ consisting of two extensions integral with two of said layers. Secured to this flap by suitable rivets $f$, preferably between the extensions, and extending radially inward therefrom, are hooks $g$, preferably metallic and approximately V-shaped, and with their tapered inner ends $h$ bent inward and turned outward as illustrated in Fig. 1, the extreme ends $h'$ being bent toward the main portions $g$ of the hooks. I prefer to strengthen and stiffen the hooks at their bent portions by means of suitable ribs $k$.

Located on each side of the protector and attached thereto by means of said hooks is a wire $s$. This wire is adapted to extend entirely around the wheel and through every hook, and its two ends $s'$ are hooked together as shown or in any desired manner. These wires are so constructed as to be elastic and capable of being stretched or expanded in the direction of their length, and hence can spring in the same direction. The shape which I prefer for the purpose of rendering the wires elastic or expansible is that illustrated, and comprises a series of uniform crimps or waves, said crimps or waves corresponding in number with the hooks $g$, and the outwardly projecting or highest portion of each crimp or wave being adapted to be caught in said hook, as illustrated in Fig. 2.

In applying the protector or cover the air is first let out of the tire, next the tread portion with the hooks attached is applied to the tire, the hooks are then caught over the wires in the manner illustrated, and the tire is then ready to be inflated. While the tire is being inflated the wires will expand or straighten uniformly between the hooks until a proper degree of inflation has been reached. When the wire is in position and the tire is in use, said wire preserves practically an even tension on the cover, and all expansion and contraction, or springing back are in the direction of its length. By reason of the wave-like corrugations the hooks are prevented from creeping on the wire, and hence creeping of the cover with relation to the wire is effectually prevented.

Having thus fully described my invention, what I claim and desire to secure by Letters Patent, is:—

1. In a detachable tread for pneumatic tires, the tread portion; a wire substantially concentric therewith and adapted to extend entirely around the wheel, said wire being rendered expansible and contractible in the general direction of its length by its shape; and hooks connected with the tread portion and extending inward radially into engagement with the said wire, for the purpose set forth.

2. In a detachable tread for pneumatic tires, the tread portion; a wire substantially concentric therewith and adapted to extend entirely around the wheel, said wire being rendered expansible and contractible in the general direction of its length by its shape; and hooks connected with the tread portion and extending inward radially into detachable engagement with the said wire, for the purpose set forth.

3. In a detachable tread for pneumatic tires, the tread portion; a wire substantially concentric therewith and adapted to extend around the wheel, said wire being formed with crimps or waves; and means for connecting said crimps or waves separately with the tread portion, for the purpose of preventing creeping.

4. In a detachable tread for pneumatic tires, the tread portion; a wire substantially concentric therewith and adapted to extend around the wheel, said wire being formed with crimps or waves; and hooks connected with the tread portion and extending radially into engagement with said crimps or waves.

5. In a detachable tread for pneumatic tires, the tread portion; a wire substantially concentric therewith and adapted to extend around the wheel, said wire being formed with crimps or waves; and hooks connected with the tread portion and extending radially into detachable engagement with said crimps or waves.

In testimony whereof I have signed my name to this specification in the presence of two subscribing witnesses.

CHARLES B. WOODWORTH.

Witnesses:
HENRY W. WILLIAMS,
A. K. HOOD.